ALBERT E. WOELFEL
INVENTOR.

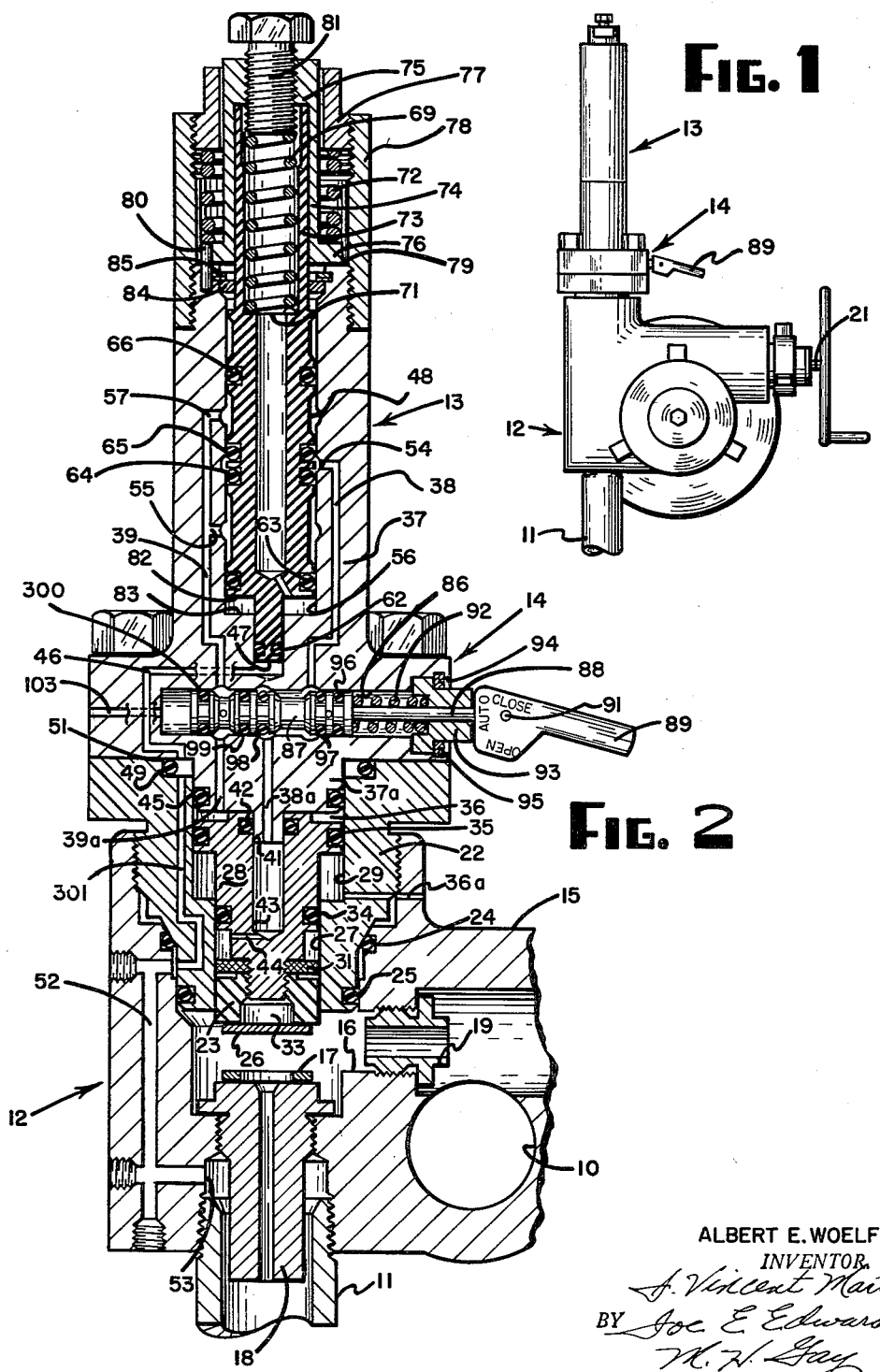

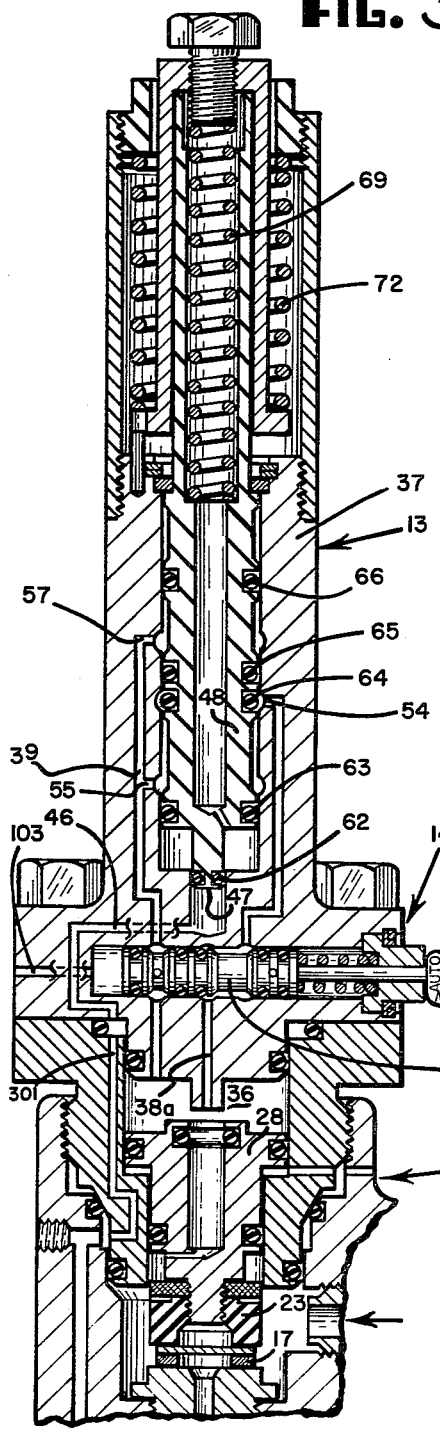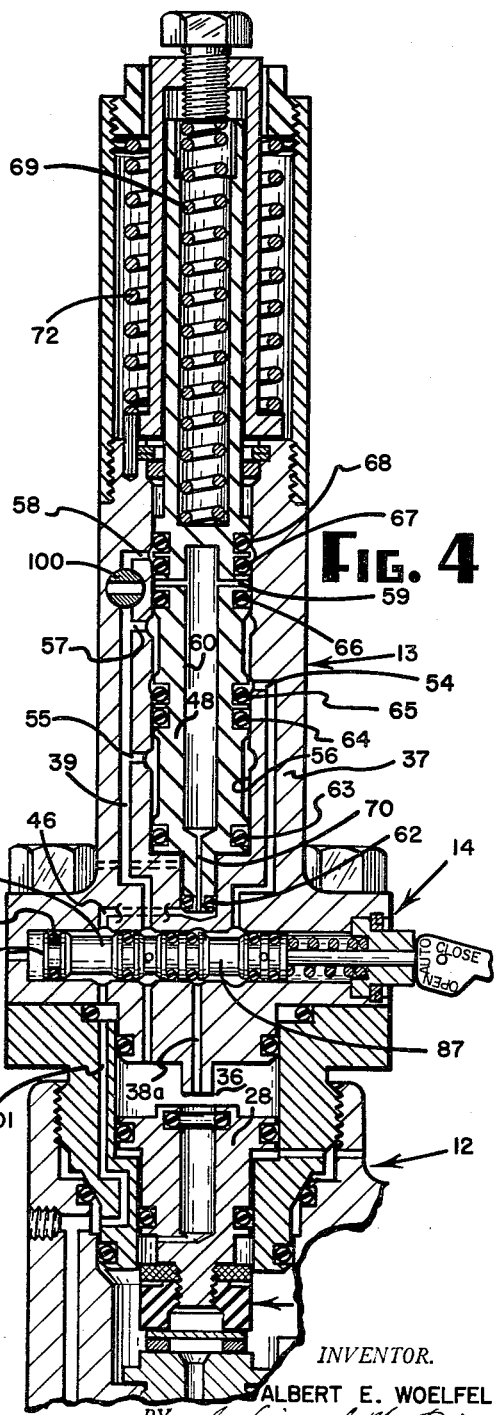

ATTORNEYS

April 2, 1963

A. E. WOELFEL 3,083,726

HIGH AND LOW PRESSURE RESPONSIVE CUT-OFF VALVE

Filed Sept. 4, 1959

ALBERT E. WOELFEL
INVENTOR.

BY J. Vincent Martin
Joe E. Edwards
M. H. Gay

ATTORNEYS

April 2, 1963  A. E. WOELFEL  3,083,726
HIGH AND LOW PRESSURE RESPONSIVE CUT-OFF VALVE
Filed Sept. 4, 1959  5 Sheets-Sheet 5

ALBERT E. WOELFEL
INVENTOR.

BY *J. Vincent Martin*
*Joe E. Edwards*
*M. H. Gay*
ATTORNEYS

United States Patent Office 3,083,726
Patented Apr. 2, 1963

3,083,726
HIGH AND LOW PRESSURE RESPONSIVE
CUT-OFF VALVE
Albert E. Woelfel, Houston, Tex., assignor to Cameron Iron Works, Inc., Houston, Tex., a corporation of Texas
Filed Sept. 4, 1959, Ser. No. 838,325
25 Claims. (Cl. 137—458)

This invention relates to line control apparatus, and more particularly to apparatus and systems for automatically interrupting flow in the line controlled in response to predetermined conditions.

In the handling of high pressure fluids in pipelines it is desirable to shut off automatically the source of fluid during emergencies. An emergency is usually considered to exist when pipeline pressures are above or below a predetermined range. Examples of pipeline conditions which would take the pressures outside of a predetermined range include "freezing" due to the formation of hydrates in the line, and a break in the line. Where the pressure drops a substantial amount in the pipeline, as across a pressure reducing choke, the line downstream from the point of reduction is not usually designed to handle the high pressure upstream of the reduction choke. Therefore, when freezing occurs in the lower pressure section of the line, it is very desirable to close off the line before the full upstream pressure is exerted on the line downstream from the reduction choke. Batteries of wells producing dual formations at different pressures are sometimes piped into a common gathering system with reducing chokes on the high pressure lines. Upon one of these high pressure chokes being cut out the high pressure formation will flow into the low pressure formation through the manifold system. This is very undesirable and the pressure should be shut off when this situation occurs.

An object of this invention is to provide a fluid operated main valve for pipelines with a resiliently loaded single control valve which will admit power fluid to the main valve operator to close the line when the control valve is subjected to a control pressure or sensing pressure which is above or below a predetermined range.

Another object of this invention is to provide a fluid operated main valve for pipelines with a resiliently loaded single control valve which will admit line fluid to the main valve operator to close the line when the pressure downstream from a pressure reducing choke in the line downstream from the main valve is above or below a predetermined range.

Another object is to provide a control valve for a main valve according to the preceding objects which will automatically effect reopening of the valve when the control pressure conditions are restored to their proper ranges.

Another object is to provide an overriding control to effect opening or closing of a valve according to the preceding objects, or to permit it to operate automatically.

Another object is to provide a fluid operated main valve for a line including a pressure reducing choke downstream from the main valve, with a control valve responsive to a control pressure such as downstream pressure for closing the line in response to the control pressure falling below or exceeding a predetermined range, together with an overriding control, in which the power fluid is vented through the control pressure line to effect opening of the main valve.

Another object is to provide a fluid operated valve for a line in which line pressure upstream from the closing member opens and closes the valve in combination with a single control valve responsive to a control pressure such as line pressure for admitting line pressure to the fluid operated valve to close the valve upon the control pressure falling below or exceeding a predetermined range.

Another object is to provide a motor valve for a line with a control valve responsive to a control pressure such as downstream pressure for closing the line in response to the control pressure falling below or exceeding a predetermined pressure range together with an overriding valve which selectively bypasses the control valve and effects opening or closing of the motor valve.

Another object is to provide a valve member which is acted upon by two resilient means such as springs in which the valve member has a short stroke and moves to one of two alternate open positions only when a control pressure effective on the valve exceeds a predetermined high pressure or falls below a predetermined pressure much lower than the high pressure at which the valve opens.

Another object is to provide a valve subject to a control pressure which shifts from closed position to one of two alternate open positions when the control pressure exceeds or falls below a predetermined range.

Other objects, features and advantages of the invention will be apparent from the specification, the drawings and the claims.

In the drawings where illustrative embodiments of this invention are shown, and wherein like reference numerals indicate like parts:

FIGURE 1 is a view in side elevation of a valve constructed in accordance with this invention;

FIGURE 2 is a view on an enlarged scale in vertical cross section through a fragment of the valve of FIGURE 1 showing the main valve in its open position;

FIGURE 3 is a view similar to FIGURE 2 showing the main valve in closed position due to an increase in control pressure above a predetermined range;

FIGURE 4 is a view similar to FIGURE 2 showing the main valve in closed position in response to a control pressure which has fallen below a predetermined range and illustrating a modification in the valve;

Figure 5:
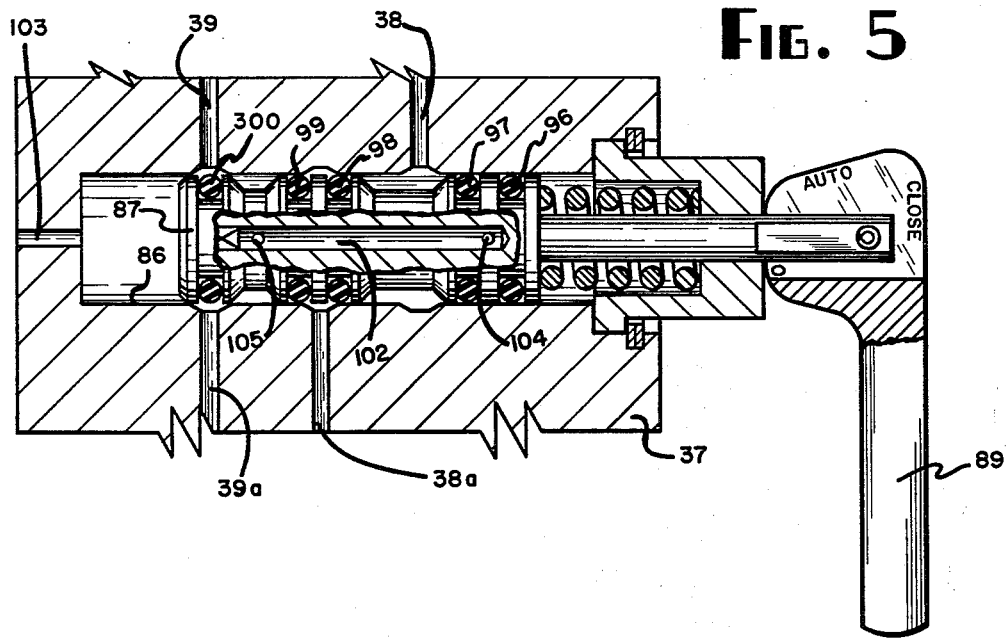
FIGURE 5 is a view on an enlarged scale of the manual control valve in position to bypass the automatic feature of the valve and open the main valve.

Referring first to FIGURES 1 through 4, the control or safety device of this invention is shown protecting a line which extends upstream from the inlet 10 and downstream from the outlet line 11. The assembly shown includes a main valve indicated generally at 12 which closes to protect the downstream line in accordance with a control pressure which is preferably the downstream pressure. The control or sensing pressure might also be obtained from other related systems. The main valve is caused to open or close by an automatic control valve indicated generally at 13. The valve 13 effects closing of the main valve 12 when the control pressure is outside of a predetermined range. A manual selector valve indicated generally at 14 permits the manual selection of automatic operating conditions as above outlined, or it permits the operator to selectively open or close the main valve and maintain the main valve in open or closed position regardless of the control pressure acting on the control valve.

Referring now to the details of the main valve 12, the valve body 15 has extending therethrough a flowway 16 which conducts upstream pressure from inlet 10 to outlet 11. Positioned across this flowway is a valve seat 17.

For purposes of clarity pressure fluid upstream of the seat will be called upstream pressure, and pressure fluid downstream of the seat will be called downstream pressure. The valve seat is carried on a flow bean 18 which reduces the pressure from the incoming line 10 to the desired pressure to be placed on the system connected to the outgoing line 11.

A second valve seat 19 is shown in the passageway 16 upstream of seat 17. This valve seat cooperates with a valve (not shown) carried by stem 21 (FIG. 1), which provides a manual shutoff.

Threadedly secured to the main valve body 12 is an adapter 22 in which the main valve member 23 is slidably mounted. Suitable seals 24 and 25 are provided between the main valve body and adapter. Dual seals are provided for confining control fluid pressure, as will be explained more fully hereinafter. The main valve member 23 is provided with a member 26 which cooperates with valve seat 17 to control flow through the main valve.

The main valve member is slidably mounted within bore 27 of adapter 22 and is carried by a pressure responsive member provided by the differential piston 28 slidable within the bore 27 and the counterbore 29 in adapter 22. A filter 31 is secured between the piston 28 and valve 23 to filter upstream fluid passing to the control and manual selector valve.

The piston 28 is provided with a sliding seal 34 in bore 27 and with a sliding seal 35 which engages the counterbore 29. A suitable vent 36a vents the space within counterbore 29 and between the seals 34 and 35. Upstream pressure will always be exerted on the area defined by O-ring 34. By conducting upstream pressure to the upper surface of piston 28, the piston and its main valve 23 may be moved downwardly in response to such pressure as the area defined by O-ring 35 is larger than the area defined by O-ring 34.

A means for automatically pressurizing and venting the chamber 36 provided by the upper portion of bore 29 to control opening and closing of main valve member 23 is provided by the control valve 13. The control valve 13 includes a body 37 having an inlet conduit 38 and an outlet conduit 39 therein. The body 37 also carries the manual selector valve 14 and provides at its lower end a body for this valve. With the manual selector valve in the automatic position as shown, the inlet and outlet conduits 38 and 39 are not interrupted and the presence of the manual selector valve may be ignored for purposes of operation of the control valve.

The various conduits for conducting upstream pressure to the fluid motor provided by piston 28, and for conducting control fluid to the control valve are preferably provided within the several valve bodies. The inlet conduit 38 has a portion 38a which terminates in a boss 41 which projects from the bottom of body 37. When the piston 28 is in its uppermost position, a suitable seal is provided by O-ring 42 between the boss and the bore 43 within piston 28 so that the bore 43 forms a continuation of the inlet conduit 38. A bleed passageway 44 interconnects the bore 43 and the exterior of piston 28 below the sliding seal 34 so that upstream pressure may bypass the main valve 23 and be conducted through the bleed 44, bore 43 and inlet conduit 38 to the control valve.

The outlet passage 39 has a portion 39a which terminates in the lower end of the body 37 and communicates with the chamber 36. A suitable O-ring seal 45 is provided between the counterbore 29 and a portion 37a of the body 37 which projects into the counterbore 29. When the control valve 13 is moved to its open position, upstream pressure will be conducted to the chamber 36 to effect closing of the main valve.

Chattering of the valve is prevented by seal 42. Once the valve has been moved sufficient to uncover seal 42 the control valve 13 is by-passed and upstream pressure fed directly to the chamber 36.

It was previously noted that spaced seals 24 and 25 between the adapter 22 and main valve body 15 confined control fluid pressure. In the preferred form of valve this control fluid pressure is directed through conduit 46 to the endwise surface 47 of the control valve member 48. While the control pressure might be provided from an outside source, it is desired to control the operation of main valve 12 directly from the condition of the line being controlled by the main valve. As downstream conditions are those which give the main concern, it is preferable to obtain the control pressure from downstream of the main valve. For this purpose, the conduit 46 communicates with a conduit 301 extending through adapter 22. It will be noted that a still further counterbore 49 is provided in the adapter and a suitable seal 51 seals between this further counterbore and the valve body 37. The control fluid conduit 46 terminates in body 37 at this further counterbore and also the control conduit 301 within the adapter 22 terminates at this counterbore. Thus, seals 45 and 49 contain the control fluid pressure as it passes between the adapter and control valve body. The control pressure conduit 301 terminates in the exterior of adapter 22 between the spaced seals 24 and 25. A control pressure conduit 52 is provided in valve body 15 and extends from a terminus between O-rings 24 and 25 and a point 53 which communicates with the downstream pipe 11 and is downstream from the pressure reduction flow bean 18.

At this point it might be noted that pressure is conducted between the adapter and the control valve body through three conduits, being conduits 38, 39 and 46. By the construction just explained, these pressure fluids may be transferred between the two bodies without the use of external conduits and without specially aligning the control valve body and the adapter. Pressure fluids are conducted between the adapter and main valve body without any special aligning problem being present. Thus, all of the conduits for the control valve are contained within the valve assembly and the use of external conduits, which are easily broken, is avoided.

Returning now to the control valve, the inlet passageway 38 terminates at point 54 in the bore 56 of the control valve body 37. The bore 56 provides a sliding valve seat for the slide valve member 48. The outlet passageway 39 opens into the bore 56 at two points 55 and 57.

In FIG. 2 the control valve member 48 is shown in the position it assumes when the downstream pressure is within the predetermined range which is proper for normal operation. At this time the spaced seals 64 and 65 are confining the upstream pressure present in the inlet conduit 38 and isolating the ports 55 and 57.

Reference is now made to FIGURE 3 which shows the position of the main valve when the control fluid pressure is greater than the predetermined range. In this instance, the control fluid pressure acts on pressure responsive surface 47 of the control valve member defined by seal 62 to move it up into the position shown. The O-ring 64 has now been moved upwardly to a position at which the inlet opening 54 is in communication with the outlet opening 55. Thus, upstream pressure passes through the control valve to the outlet conduit and thence to chamber 36 where it is effective to move the pressure responsive member 28 and main valve member 23 downwardly until the main valve engages valve seat 17 and closes off flow through the main valve.

Reference is now made to FIGURE 4 in which the control valve is shown in a position effecting closure of the main valve due to a decrease in control pressure below the predetermined range for normal operation. In this instance, the pressure against the endwise surface 47 of the control valve member has decreased and the control valve member has moved downwardly to a position in which the inlet opening 54 is placed in communication with the outlet opening 57. Thus, the upstream pressure entering through inlet opening 54 is transmitted to the outlet opening 57 and thence through the outlet conduit 39 to the chamber 36 where it is effective on piston 28 to close the main valve.

The valve shown in FIGURE 4 has been modified slightly to permit it to be automatically returned to open position upon the control pressure returning to the predetermined operating range. The outlet conduit 39 is provided with a port 58 which opens into bore 56. Two additional seals 67 and 68 are spaced along the upper end of valve member 48. With the valve member 48 in open position due to a decrease in control pressure, the seals 67 and 68 confine port 58 to prevent loss of fluid from conduit 39 through port 58. When the valve member 48 is in its upper open position, seal 66 prevents loss of fluid from opening 58 through vent 59. When the valve member 48 is returned to its intermediate or closed position, the opening 58 is straddled by seals 66 and 67 and opening 58 communicates with bore 60 in valve member 48. The bore 60 communicates with source line 46 through a conduit 70 in the lower end of the valve member 48. Thus, when the valve member 48 returns to intermediate position, the chamber 36 will be dumped into the source line 46 to allow line fluid pressure to effect movement of the piston to open the main valve 12. A valve 100 in line 39 was considered to be open in the above discussion. This valve will be discussed hereinafter.

It is desirable to permit the main valve to remain open while the control pressure is within a predetermined range. As this range is fairly broad, means should be provided for determining movement of the control valve due to a reduction in control pressure separate from that means which controls movement of the control valve due to an increase in pressure. By this expedient any desired range of any desired magnitude may be selected. Referring again to FIG. 2, for the purpose of shifting the control valve member 48 downwardly upon a decrease in control fluid pressure, resilient means provided by a compression spring 69 bears against the end 71 of control valve member 48 remote from the surface 47 which is exposed to control pressure. Thus, as the control fluid pressure decreases below the selected predetermined range, the spring 69 is effective to move the control valve member downwardly to its FIGURE 4 position and effect closing movement of the main valve member.

For purposes of opposing movement of the control valve member upwardly due to an increase in control fluid pressure, a second resilient means is provided by spring 72 which resists upward movement of the control valve member 48. The end 71 of the control valve member has an actuator 73 extending therefrom in which the spring 69 is positioned. A second actuator 74 is telescoped about the actuator 73 and has a stop provided by its end closure 75 which engages the free end of the first actuator 73. The second actuator has an outwardly extending flange 76 and the spring 72 is compressed between the flange 76 and an abutment 77 carried by a sleeve 78 on the control valve body. It will be noted that the flange 76 overlies the end 79 of the control valve body and when the control valve member 48 is in the position shown in FIGURE 2, the flange 76 is in engagement with the end 79 of the control valve body which provides a stop limiting the distance through which the spring 72 is effective to urge the valve member against the force exerted by downstream pressure on the slide valve member. However, as the control fluid pressure increases above the predetermined range at which the valve is to remain open, the end of the first actuator 73 engages stop 75, and the spring 72 will be compressed between the flange and the abutment provided by end closure 77 and will permit upward movement of the slide valve member due to the increase in control fluid pressure. The second actuator 74 is guided in its movement by guide pins 80 which are carried by the slide valve body 37.

By utilizing the stop 75 and the stop 79, opening of the control valve to effect closing movement of the main valve member due to a decrease in control fluid pressure is effected solely by spring 69, and opening of the control valve to effect closing movement of the main valve member due to an increase in control pressure is resisted solely by spring 72. It will be appreciated, however, that the adjusting bolt 81 against which spring 69 bears might be carried by the body instead of the second actuator 74 and be effective along with the outside spring 72 to resist upward movement of the slide valve member. For convenience of construction, the illustrated assembly is preferred.

The desired range of pressure at which the main valve member will remain open is provided by adjusting the position of screw 81 and adjusting the position of the abutment 77 against which the spring 72 bears.

Excess movement of the slide valve member due to the force exerted by spring 69 is prevented by the lower end 82 of the slide valve member engaging the lower end 83 of the bore 56.

Excess movement of the slide valve member in an upward direction is prevented by engagement of the upper end 71 of the slide valve member with a retainer ring 84 which is held in place by a snap ring 85.

From the above it will be seen that movement of the slide valve member is controlled by two resilient means, one of which moves the slide valve member against the control pressure, and the other of which is compressed by the upward movement of the slide valve member in response to control pressure. A stop is provided to prevent one of the resilient means from being effective while the other is operative. Preferably, two stops are provided so that the resilient means are alternately effective.

Reference is now made to the manual selector valve 14 which controls the conduits which pressurize and vent the chamber to shift the pressure responsive member which in turn shifts the main valve member. Attention is also directed to FIGURES 5 and 6 which with FIGURE 2 show the three positions of the manual selector valve. As above noted, the lower end of the control valve housing 37 provides a housing for the manual selector valve. The lower end of the housing 37 is provided with a bore 86 in which the slide valve member 87 is mounted for reciprocation. The slide valve member is carried on an actuator rod 88 which is pivotally connected to a control handle 89. By rotating the control handle about the pivot 91 the valve member 87 may be shifted to three different positions due to the distances of the sides of the handle marked "closed," "automatic" and "open" from the pivot 91. A spring 92 is compressed between the valve member and a bushing 93 which is held in a counterbore 94 by a suitable snap ring 95 and urges the handle 89 into engagement with bushing 93.

The slide valve member 87 is provided with spaced O-rings 96, 97, 98, 99 and 100. An interior passage 102 in valve member 87 communicates with the space between O-rings 96 and 97, and with the space between O-rings 99 and 100 through outlets 104 and 105, respectively.

Figure 6:
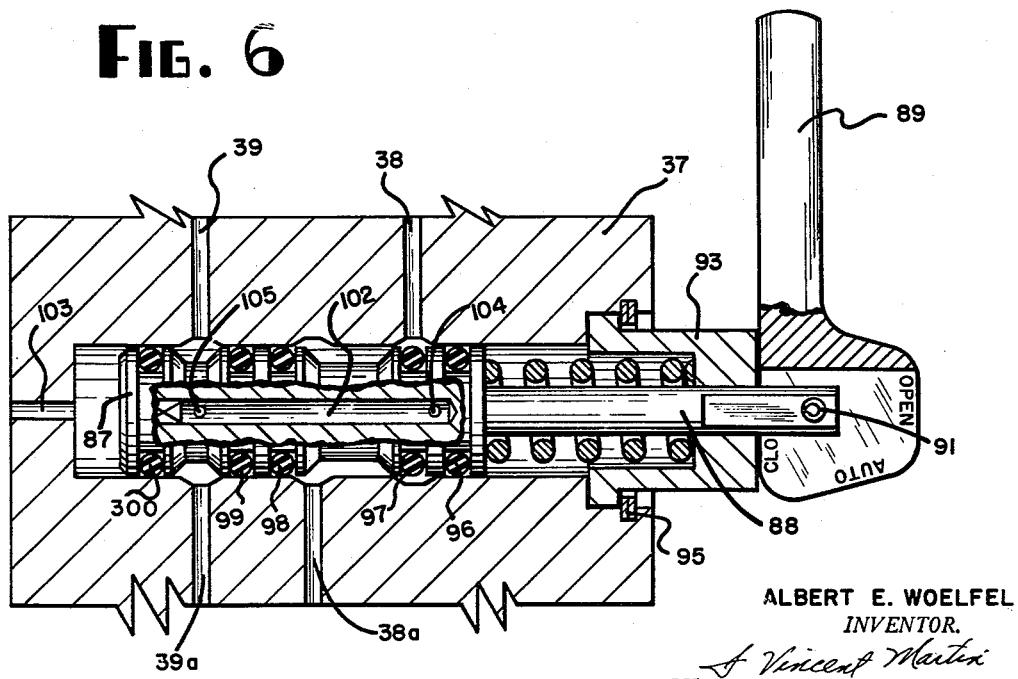
FIGURE 6 is a view similar to FIGURE 5 with the valve shown in a position to close the main valve.

The operation of the manual selector valve is shown in FIGURES 2, 5 and 6. In FIGURE 2 the manual selector valve is in automatic position. The pressure fluid in conduit 38 is confined between O-rings 97 and 99. The pressure fluid when present in conduit 39 is confined between O-rings 99 and 300. The connecting passageway 102 within the slide valve is ineffective at this time as it is confined on one end by O-rings 96 and 97 which are in a portion of the slide valve seat 87 which does not contain an opening.

Referring particularly to FIGURE 5, the manual selector valve member is shown positioned to bypass the control valve 13 and to effect opening of the main valve 12. At this time upstream pressure in conduit 38 is interrupted by O-rings 98 and 99 straddling the passageway 38a. The O-ring 300, however, has been moved to the right to open the passageway 39a to the end of the bore 86. A vent passage 103 is provided between the bore 86 and the exterior of body 87, and thus any pressure trapped in chamber 36 is vented past O-ring 300 to atmosphere to permit upstream pressure acting on the area defined by O-ring 34 to move the main valve member to open position. It will be noted that if at this time the downstream pressure is such that the control valve member is moved into a position to establish communication between inlet passageway 38 and outlet passageway 39, that such action will be ineffective to shift the control valve member as the inlet passageway 38a has been interrupted by the automatic selector valve, and the main valve will remain open.

Referring now to FIGURE 6, the closed position of the manual selector valve is shown. In this case the valve member 87 has been shifted to the left, as viewed in the drawings, to permit the upstream pressure to bypass seal 97, which is ineffective as the bore 86 is enlarged at conduit 38, to pressurize the area between O-rings 96 and 97. This pressure passes through port 104 into passageway 102 and out through port 105 to the passageway 39 which is now straddled by seals 99 and 300. From passageway 39 the upstream pressure is conducted to chamber 36 to cause the piston to move the main valve to closed position. It will be noted that in this instance movement of the control valve member 48 to any of its three positions will be ineffective as upstream pressure will continue to be effective in chamber 36 to maintain the valve closed.

In the FIGURE 4 modification provision must be made for preventing loss of upstream pressure fluid through conduit 39 when the manual selector is moved to valve closing position. Any suitable type of valve may be provided to close conduit 39 at this time such as the valve indicated at 100. The vent passageway 103 is omitted in this form and the sensing pressure passageway passes through the manual selector valve. The manual selector valve 14 is modified to provide a valve member 87a which is identical with the valve member 87 except that a portion 87b having seal 101 is provided. Seal 101 isolates the free end of the valve member and prevents an unbalancing pressure being placed on the end of the valve member. This is not necessary, but is a desirable feature.

In operation the valve is installed in a flow line such as in the gathering system of a well closely adjacent to the Christmas tree. Assuming the manual selector valve 14 to be set on automatic, and the downstream pressure to be within the range selected by the adjustment of the compression on springs 69 and 72 of the control valve, the main valve member 28 will be in open position as shown in FIGURE 2. If, for some reason, the pressure downstream of the seat 17 either falls below or rises above the pre-set range, the control valve member will shift either up or down with an increase or decrease in pressure below this range, respectively, to uncover inlet 54 of the control valve. When this happens, the upstream pressure passing up through the main valve and manual selector valve will be conveyed through the control valve to outlet line 39 and thence to the chamber 36 above the main valve operating piston 28. As pressure within this chamber builds up, the main valve will move downwardly until seal 42 on boss 41 is uncovered. When this occurs, upstream pressure will flow directly from bore 43 into the pressure chamber 36 and positively move the main valve member to fully closed position.

With the valve of the type shown in FIGURE 2 once closed, the happenings in downstream pressure are thereafter ineffective upon the main valve, and the main valve will remain closed until the manual selector is operated to open the valve.

The manual selector may, when desired, be moved to open position which will close the inlet conduit 38a and will move the O-ring 300 from between the passageway 38a and the vent passage 103. When communication is established between these two passageways, the chamber 36 is vented to atmosphere to open the main valve. At this time the manual selector may be left on "open" to render ineffective the control valve 13, or it may be returned to "automatic" for automatic operation in the manner previously explained.

If at any time it is desired to close the main valve, the manual selector is turned to closed position, which permits flow through the passageway 102 of the manual selector valve, and in effect establishes communication between the inlet passageway 38a and the outlet passageway 39a to pressurize chamber 36 and move the main valve to closed position. This action effectively bypasses the control valve 13, and the condition of the pressure fluid downstream of the main valve will have no effect upon the main valve.

From closed position the valve is opened in the manner explained above by moving the selector arm to open position and then the main valve may remain in manual open position or it may be placed in automatic position.

Referring to FIGURE 4, the operation of this valve is the same as previously explained, except that when the valve is in the automatic position it may be arranged for automatic return of the main valve to open position when the conditions downstream are returned to the predetermined selected range. Normally, valve 100 is in open position and the manual selector valve in automatic position. In this case, the outlet line 39 communicates with the sensing pressure line 46 through the ports 59 in the control valve. Thus, the chamber 36 is subjected to sensing pressure. It will be appreciated that when this form of the valve is used there must be a substantial differential between upstream and downstream pressure, and such differential is used as the operating pressure. Of course, if an outside pressure is used, a like differential must be employed.

When the sensing pressure changes to a pressure without the predetermined range, the control valve member will move to a position uncovering inlet 54 to subject the chamber 36 to upstream pressure. This effects closing of the main valve member. Thereafter, the main valve may be opened in the manner previously explained by utilizing the manual selector valve and dumping pressure within chamber 36 into the sensing line by moving O-ring 300 to the right to uncover line 39a.

If the manual selector valve is left on automatic and thereafter the control valve pressure returns to the predetermined range, the control valve 48 will be shifted to its intermediate closed position at which the inlet line 54 is straddled by seals 64 and 65 to close off the upstream pressure. At this time the passageway 59 in the control valve member 48 will be in communication with port 58 of the outlet line and pressure within the chamber 36 will be dumped through this port, the bore 60 within the control valve member, and conduit 70 into the source pressure line, and the main valve member will move to open position.

In the alternative, the manual selector valve may be operated in the manner above explained to manually establish communication between the line 39a and the source pressure line by moving O-ring 300 to the right to uncover conduit 39a.

The manual selector may also be moved in the manner previously explained to the closed position to manually move the main valve member to closed position by providing for by-passing the control valve and conducting pressure fluid to the chamber 36 through passageway 102 within the manual selector valve. However, at this time it will be apparent that upstream pressure will be continuously supplied to the chamber 36 through the bleed passageway 44 and thence into the outlet passageway 39 of the control valve. If valve 100 is open, this pressure will pass through the port 59 within the control valve member, and thence into the sensing pressure line, which would result in a continuous bleed of upstream pressure into the sensing line. For this reason, the manual valve 100 is placed in the outlet line 39 so that when the valve is manually placed in closed position, the valve 100 may also be turned to closed position to prevent this passage of pressure fluid from the upstream line into the sensing pressure line.

Figure 7:
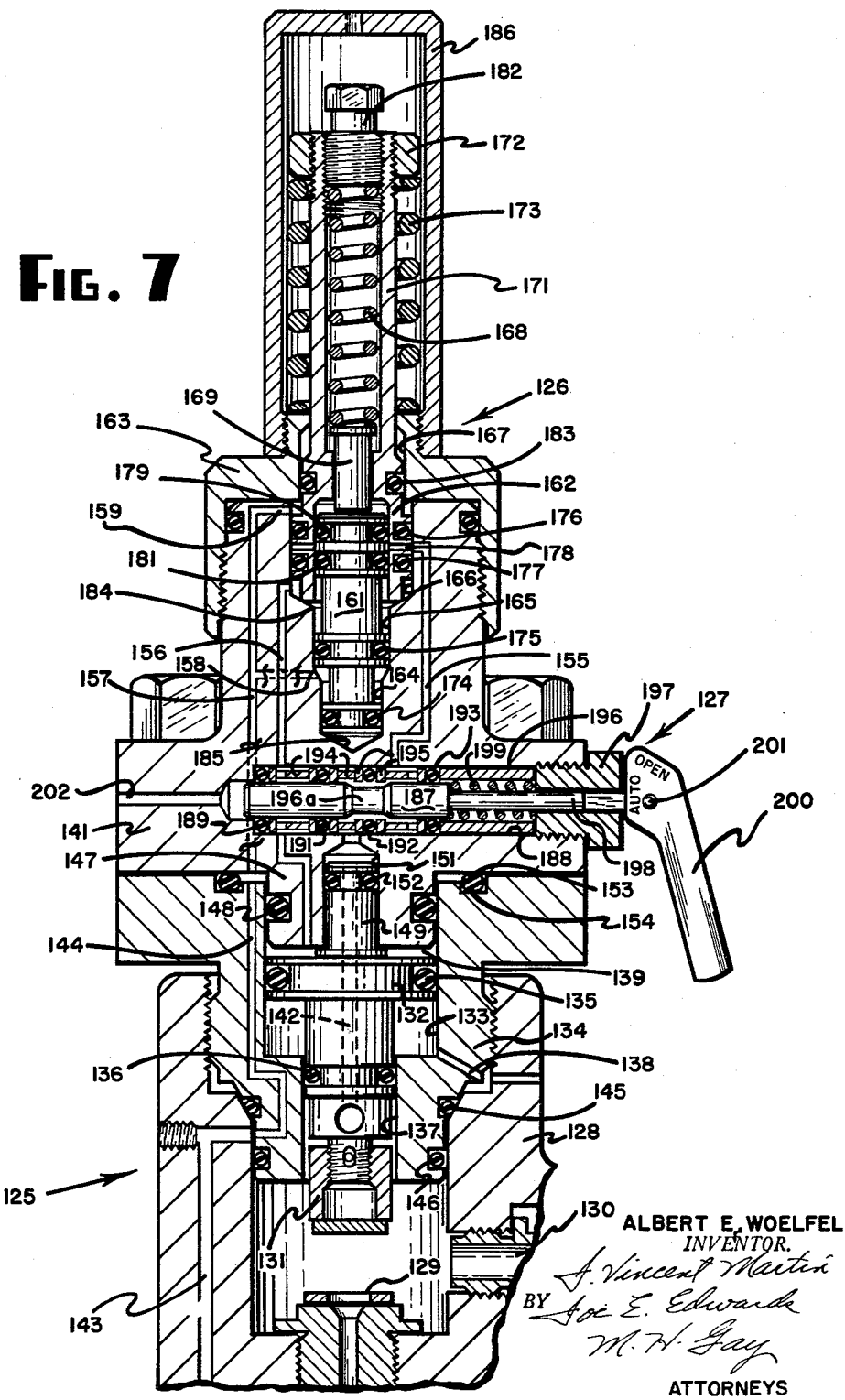
FIGURE 7 is a view in vertical cross section through a modified form of valve.

Referring now to FIGURE 7, an alternate form of this invention is shown. While the particular structure differs, there is, as in the case of the previously explained embodiment, a main valve indicated generally at 125, a control valve indicated generally at 126, and a manual selector or reset valve 127. The function of the main valve is the same as the function of the main valve of FIGURE 2. The control valve 126 operates in the same manner as the control valve of FIGURE 2, except that the slide valve member is in two parts, and there is no provision for venting the pressure responsive member which controls the main valve member to maintain it in open position. The reset valve 127 vents the pressure responsive member to permit opening of the main valve after it has been closed by the control valve. Thus, the reset valve 127 functions to maintain the main valve in open position or permits the automatic operation of the system in response to the control valve 126, but it does not provide for selective closing of the main valve. Of course, the manual selector valve of FIGS. 5 and 6 might be substituted for reset valve 127 and provide for both opening and closing of valve 125.

The main valve includes a body 128 having a valve seat 129 across the passageway 130 which is controlled by the main valve. The passageway is controlled by a main valve member 131 cooperating with the seat 129. The opening and closing of the main valve member is controlled by a pressure responsive member provided by piston 132. The piston 132 is reciprocally mounted in a bore 133 of an adapter 134 which is secured to the main valve body 128. The piston 132 is provided with a sliding seal 135 with the bore 133, and a second sliding seal 136 of smaller diameter than seal 135 is provided between the piston and the reduced diameter bore 137 in adapter 134. The space within the bore 133 between these two seals is vented to atmosphere through a suitable vent passageway 138. Thus, upstream pressure in passageway 130 is effective over the area of seal 136 and the larger seal 135 defines an area exposed to the pressure chamber 139 which may be pressurized with upstream pressure to close the main valve.

As in the case of the embodiment of FIGURE 2, upstream pressure is conducted through the piston 132 to the body 141 for the control and reset valves by the passageway shown in dashed lines at 142.

Control pressure is conducted to the body 141 from downstream of seat 129 by a passageway 143 in the main valve body 128 and a passageway 144 in the adapter 134. These two passageways communicate with each other and pressure passing through the passageways is confined by spaced seals 145 and 146 between the main valve body and adapter.

The body 141 has a boss 147 which extends into bore 133 and a suitable seal 148 defines the chamber 139 which is pressurized and vented to control the main valve. In this form of the invention the main valve piston 132 is provided with a boss 149 which extends into a bore 151 in the lower end of the body 141. A sliding seal 152 is provided between these parts to contain upstream pressure from passageway 142 in the main valve. A counterbore 153 is provided in the adapter 134 and a suitable seal 154 seals between the adapter and body 141. This seal cooperates with seal 148 on the boss 147 to confine pressure fluid from the control passage 144.

Upstream pressure from the passageway 142 in the piston passes through the reset valve 127 to an inlet passageway 155 in the body 141 to the control valve 126. An outlet passageway 156 is provided in the body and this passageway establishes communication between the control valve 126 and the chamber 139 through the reset valve 127.

Control fluid from passageway 144 is conducted by a control fluid passageway 157 in the body 141 to the control valve 126. The passageway 157 conducts control pressure to the control valve at two points via passageways 158 and 159.

The control valve 126 is provided by a two-piece slide valve member having a pin 161 within a sleeve 162 cooperable with a multiple diameter slide valve seat provided by the body 141 and by the cap 163. The body 141 is successively counterbored to larger diameters to provide the stepped bores 164, 165 and 166. The cap 163 has a bore 167 therethrough which is smaller than the bore 166.

The pin 161 is urged downwardly by a resilient means such as spring 168 which bears on the pin 161 through rod 169 which extends through the sleeve 162. The pin is thus resiliently loaded in one direction.

The sleeve 162 has an actuator or extension 171 thereon which surrounds the spring 168 and carries an adjustable stop 172 at its upper end. A spring 173 provides a resilient means which is compressed between the adjustable stop 172 and the upper end of cap 163. This spring urges the sleeve 162 of the slide valve member in an upward direction.

Control fluid pressure from conduit 157 is effective on the pin through the outlet 158. Spaced seals 174 and 175 are provided on the pin and these seals straddle the outlet 158. As the sliding seal 175 is of larger diameter than the sliding seal 174, an effective area is provided on the pin 161 against which control pressure acts in opposition to spring 168. The pin controls closing of the main valve member 131 when an excess pressure is present in the downstream line, and effects closing of the main valve by an upward movement of the pin against spring 168 to uncover the inlet passageway 155. It will be noted that the sleeve 162 is provided with spaced seals 176 and 177 which straddle the inlet of passageway 155. A passageway through the sleeve is provided at 178 which, with the sleeve in the position shown, is in alignment with the inlet of passageway 155. The pin is provided with sliding seals 179 and 181 which straddle the passageway 178 in the sleeve 162 and confine the pressure from the inlet passageway 155 when the parts are in the position shown. When the control pressure exceeds a predetermined value, the pin 161 is shifted upwardly and the seal 181 uncovers the port 178 in the sleeve 162 and establishes communication between the inlet passageway 155 and the outlet passageway 156. This action permits the upstream pressure to pass through the outlet passageway 156 to chamber 139 and effect closing of the main valve member. Of course, the pressure at which the pin 161 will move upwardly is determined by the set of the adjustable abutment 182 which determines the degree of compression of spring 168.

The sleeve 162 controls closing of the main valve member when the pressure in the control passageway 157 reduces below a predetermined value. A sliding seal 183 cooperates with seal 176 to straddle the inlet passageway 159. As the seal 176 is larger than seal 183, there results an effective area on which pressure from control passageway 157 acting through outlet 159 may act on the sleeve in a downward direction. As previously noted, the spring 173 urges the sleeve in an upwardly direction which is opposite to the force exerted by control fluid pressure. Thus, as the control fluid pressure decreases to a value less than the predetermined range for which the valve is set, the spring 173 will move the sleeve upwardly until seal 177 uncovers the inlet passageway 155 and thus establish communication between the inlet passageway 155 and the outlet passageway 156 to pressurize chamber 139 and close the main valve.

It will be noted that the action of each of the pin and sleeve is predicated upon the other of the pin and sleeve being in a fixed position. Thus, when the pin moves upwardly the sleeve must be in the position shown. To assure the positioning of the sleeve at this time, a stop 184 is provided by the sleeve body which is engaged by the sleeve and limits movement of the sleeve due to an increase in control pressure. Thus, as the pressure within the control passageway increases to a value in excess of a predetermined range, the sleeve will be held against its stop and will be stationary while the pin is moved against the force of spring 168. Likewise, the pin should be in a fixed position when the sleeve is moved by a reduction in pressure, and for this purpose a stop 185 is provided by the body which is engaged by the end of the pin 161 under the influence of spring 168 when the control pressure from outlet 158 is reduced.

The spring 168 might bear against an abutment other than 182 which could be carried by the closure cap 186. However, for assembly purposes, it is preferred to have the stop 182 carried in the actuator 171. While the compression of the spring is reduced when the actuator moves upwardly under the influence of spring 173, the control pressure acting on the pin will be reducing at this time and the forces involved are such that the pin 161 will remain against stop 185 even with the reduced compression of spring 168.

Once the upstream pressure moves into bore 166 it is effective on sleeve 162 over an area defined by seals 177 and 181 in an upward direction. This pressure will positively move the sleeve to full upper position uncovering the inlet line and prevent chattering of the main valve. With this arrangement the main piston seal 152 need not be uncovered to prevent chattering.

Referring now to the reset valve 127, the body 141 provides a valve body for cooperation with the slide valve member 187. A bore 188 is provided in the body 141 which is of larger diameter than the valve member 187. Four seals 189, 191, 192 and 193 seal between the valve body and valve member. These seals are spaced by suitable spacers 194 and backup rings 195 so that the seals 189 and 191 straddle outlet passageway 156, the seals 191 and 192 straddle the outlet from bore 151, and seals 192 and 193 straddle the inlet passageway 155. The several seals, spacers and backups are held in position by a spacer 196 and a bushing 197 through which the actuator rod 198 for the valve member extends. A spring 199 urges the valve member to the left and a handle 200 is pivoted to the stem 198 at an offset position at 201.

In operation the reset valve member is normally positioned as shown in the drawing. At this time the small diameter portion 196a of valve member 196 straddles seal 192 making it ineffective and upstream pressure from the passageway 142 in the piston is conducted to the inlet passageway 155 of the control valve. In the event the main valve is closed and it is thereafter decided to open the main valve, the handle 200 is rotated about the pivot 201 to move the valve member 196 against the spring 199 and withdraw the valve member from engagement with the seal 189. When this occurs, pressure within chamber 139 is vented through the vent passageway 202 between the exterior of the body 141 and the bore 188. At this time the reduced diameter portion 196a will have moved to a position between seals 192 and 193 so that seal 192 will be engaged by the valve member and will cooperate with seal 191 to interrupt or prevent flow of pressure fluid to inlet passageway 155. Thus, the valve may be opened regardless of the position of the control valve as the power fluid will be effectively shut off from the control valve.

Figure 8:
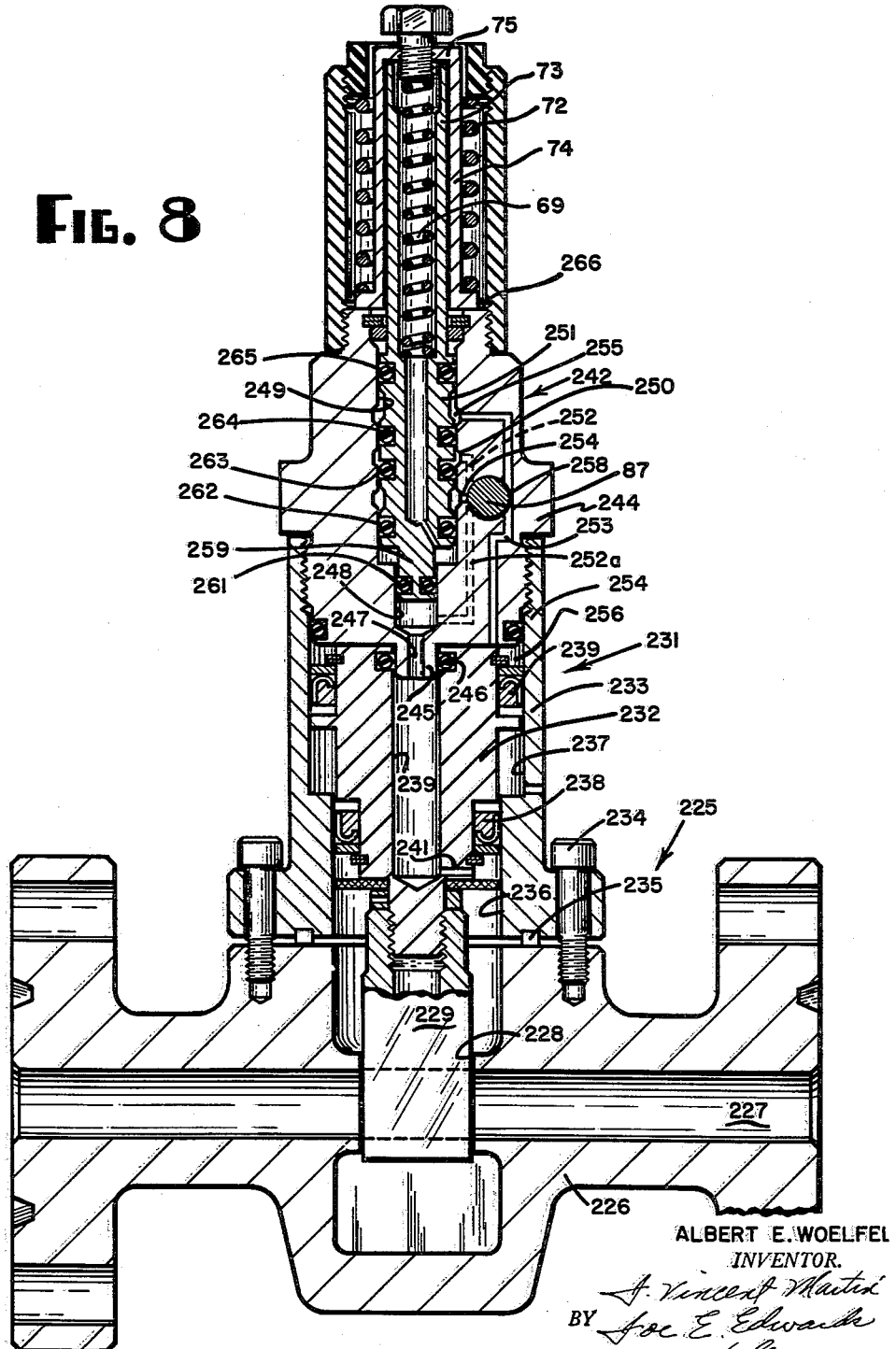
FIGURE 8 is a view in vertical cross section through a still further modified form of valve.

Referring now to FIGURE 8, there is shown a still further form of this invention which differs from the previous embodiment in that the main valve does not provide a pressure drop when the line is open, and therefore the full line pressure is used both as a control pressure and as power pressure for controlling the valve. The main valve indicated at 225 is a gate valve provided by a body 226 having a passageway 227 therethrough controlled by a seat 228 across the passageway and a valve member 229. All of the controls for the gate valve are carried in the bonnet of the valve which is indicated generally at 231.

The valve member 229 is carried on a pressure responsive member provided by piston 232. The bonnet 231 includes an adapter 233 which is sealingly secured to the valve body by studs 234 and a ring seal 235. The adapter has formed therein a bore 236 and a counterbore 237. The piston 233 carries spaced seals 238 and 239 which slidably engage bores 236 and 237, respectively. As seal 239 is larger than seal 238, a differential area is present on the valve member 232 which may be subjected to line pressure to close the valve against the line pressure active on the lower seal 238. Line pressure enters bore 239 in piston 232 through a bleed 241. In each of the embodiments it should be noted that when the valve is returned from closed to open position the bleed passageways in the pistons permit the pressure chamber to be vented faster than upstream pressure can enter the chamber.

Secured to the upper end of adapter 233 is a control valve indicated generally at 242. The control valve includes a body 244 forming a part of the bonnet which is secured to adapter 233 and has a depending boss 245 which extends into bore 239 of piston 232 when the main valve is open. A suitable seal 246 is provided between the piston and boss. The boss has a conduit 247 therein which conducts fluid pressure to the control valve.

The control valve body has a bore 248 and a counterbore 249 therein for receiving the slide valve member 251. The passageway 247 communicates with bore 248 to supply line pressure as a control pressure to an endwise surface of the valve member 251. An inlet passageway shown in dashed lines at 252 conducts line pressure to the counterbore 249 at opening 250.

An outlet passageway 253 opens into counterbore 249 through spaced openings 254 and 255. The outlet passageway 253 communicates with the chamber 256 formed in the upper end of adapter 233 by the seal 257 between the control valve body and adapter. Thus, when line 253 is pressurized with line pressure the pressure responsive member will move the main line valve 229 downwardly to closed position.

A manual selector valve member 87 cooperates with bore 258 to manually control the valve in the manner explained above. The bore 258 and the points of connection with this bore of the inlet and outlet passageways are the same as shown in FIGURE 2. In other words, portion 252a of line 252 will communicate with bore 258 at an intermediate point. The portion of the line 252 which leads to the slide valve will communicate with the bore on one side of portion 252a and the outlet passageway 253 will communicate with the bore on the other side in exactly the manner shown in FIGURE 2. The manual selector valve member 87 is identical with that shown in FIGURE 2 and operates in the same manner to manually control the valve.

The control valve member has a depending boss 259 which is provided with a suitable seal 261 and defines an area subject to line pressure. Within the counterbore 249 the valve member 251 is provided with spaced seals 262, 263, 264 and 265. With the valve member in open position, these seals are arranged so that seals 263 and 264 straddle inlet opening 250, seals 264 and 265 straddle outlet passageway 255, and seals 262 and 263 straddle the outlet passageway opening 254. So long as the valve member is in the position shown, line pressure is prevented from reaching outlet openings 254 and 255. With upward movement of the valve member, seal 263 passes over the inlet passageway 250 which then is in communication with the outlet passageway 254 to pressurize chamber 256 and close the valve. Likewise, downward movement of the valve member will move seal 264 over passageway 250 and establish communication between inlet passageway 250 and outlet passageway 255 to again pressurize chamber 256.

The remainder of the control valve member is identical with the control valve member shown in FIGURE 2. A resilient member provided by spring 69 urges the valve member downwardly against the force of line pressure, and when the line pressure falls below a predetermined value, the valve member will be shifted downwardly by spring 69. The actuator 74 is resiliently loaded in a downwardly direction by spring 72 which is effective to move the valve member downwardly only a predetermined distance before the actuator strikes the stop 266 provided by the upper end of body 244. The upper end 75 of actuator 74 provides a stop which is engaged by actuator 73 when the valve member is subjected to a pressure in excess of a predetermined range to compress spring 72, and thus spring 72 will resist the upward movement of the valve member due to an increase in line pressure.

In operation, the device of FIGURE 8 is substantially identical with the device of FIGURE 2 except that the control pressure is the line pressure instead of downstream pressure. When this pressure exceeds a predetermined value, the control valve is shifted upwardly against the force of spring 72 to pressurize chamber 256 and effect closing of the main valve member 229. When the main line pressure falls below a predetermined value, the control valve member is moved downwardly by a spring 69 to effect closing of the main valve member.

From the above it will be seen that the objects of this invention have been attained. There has been provided a valve which is automatically closed when the control pressure is outside of a predetermined range. This control pressure may be from upstream from the valve member, downstream from a pressure reducing choke in the line downstream from the valve, from a related system, etc., or an independent source of control pressure. This control system has been obtained with a single control valve which considerably reduces the complexity of the system. There has also been provided a manual selector valve which can override the automatic control valve and permit manual selection of movement of the valve to either open or closed position.

The complete control system is provided without the necessity of any outside conduits which might be broken off.

While the valve is illustrated as being controlled by a single pressure fluid, it is, of course, apparent that the principle of loading of the single valve member with two springs might also be carried out where two different pressures are active on the valve member to control the valve member in response to a differential in pressure.

The foregoing disclosure and description of the invention is illustrative and explanatory thereof and various changes in the size, shape and materials, as well as in the details of the illustrated construction, may be made within the scope of the appended claims without departing from the spirit of the invention.

I claim:

1. A valve for controlling a flow line comprising, a body, a flowway through the body, a valve seat across the flowway, a valve member cooperable with the seat and controlling flow through the flowway, a pressure responsive member connected to the valve member and when subjected to upstream pressure moving the valve member into engagement with the seat, a first conduit conducting upstream pressure fluid to the pressure responsive member, a slide valve including a slide valve body and slide valve member having two open positions and a closed position controlling said first conduit, a second conduit conducting control fluid pressure to at least one endwise pressure responsive surface on the slide valve member, first resilient means urging the slide valve member in a direction opposed to the force exerted by control fluid pressure on the slide valve member, second resilient means urging the slide valve member in a direction opposed to the force exerted by control fluid pressure on the side valve member, and stop means carried by the slide valve body limiting the distance through which the first resilient means is effective to urge said valve member against the force exerted by control fluid pressure on the slide valve member.

2. The valve of claim 1 in combination with second stop means carried by the slide valve body and limiting contraction of the second resilient means.

3. A valve for controlling a flow line comprising, a body, a flowway through the body, a valve seat across the flowway, a valve member cooperable with the seat and controlling flow through the flowway, a pressure responsive member connected to the valve member and when subjected to upstream pressure moving the valve member into engagement with the seat, a first conduit conducting upstream pressure fluid to the pressure responsive member, a slide valve including a slide valve body and slide valve member having two open positions and a closed position controlling said first conduit, a second conduit conducting downstream pressure to at least one endwise pressure responsive surface on the slide valve member, first resilient means moving the slide valve member to one open position in response to a reduction in downstream pressure, second resilient means resisting movement of the slide valve member to a second open position in response to an increase in downstream pressure, and stop means carried by the slide valve body and limiting the distance through which the second resilient means is effective to urge said valve member against the force exerted by downstream pressure on the slide valve member to maintain the second resilient means under a predetermined load and render it ineffective until the downstream pressure reaches a predetermined value.

4. A valve for controlling a flow line comprising, a body, a flowway through the body, a valve seat across the flowway, a valve member cooperable with the seat and controlling flow through the flowway, a restriction in the flowway providing a pressure drop, a pressure responsive member connected to the valve member and when subjected to upstream pressure moving the valve member into engagement with the seat, a first conduit conducting upstream pressure fluid to the pressure responsive member, a slide valve including a slide valve body and slide valve member having two open positions and a closed position controlling said first conduit, a second conduit conducting downstream pressure to at least one endwise pressure responsive surface on the slide valve member, a first spring moving the slide valve member to one open position in response to a reduction in downstream pressure, a second spring resisting movement of the slide valve member to a second open position in response to an increase in downstream pressure, and stop means carried by the body and limiting the distance through which the second spring is effective to urge the valve member against the force exerted by downstream pressure on the slide valve member.

5. A valve for controlling a flow line comprising, a body, a flowway through the body, a valve seat across the flowway, a valve member cooperable with the seat and controlling flow through the flowway, a pressure responsive member connected to the valve member and when subjected to upstream pressure moving the valve member into engagement with the seat, a first conduit conducting upstream pressure fluid to the pressure responsive member, a slide valve including a slide valve body and slide valve member having two open positions and a closed position controlling said first conduit, a second conduit conducting downstream pressure to at least one endwise pressure responsive surface on the slide valve member, a first spring moving the slide valve member to one open position in response to a reduction in downstream pressure, a second spring resisting movement of the slide valve member to a second open position in response to an increase in downstream pressure, and means rendering one of said springs ineffective during movement of the slide valve member by or against the other of said springs.

6. A valve for controlling a flow line comprising, a body, a flowway through the body, a valve seat across the flowway, a valve member cooperable with the seat and controlling flow through the flowway, a pressure responsive member connected to the valve member and when subjected to upstream pressure moving the valve member into engagement with the seat, a first conduit conducting upstream pressure fluid to the pressure responsive member, a slide valve including a slide valve body and slide valve member having two open positions and a closed position controlling said first conduit, a second conduit conducting downstream pressure to at least one endwise pressure responsive surface on the slide valve member, a first spring moving the slide valve member to one open position in response to a reduction in downstream pressure, a second spring resisting movement of the slide valve member to a second open position in response to an increase in downstream pressure, and means rendering each of said springs ineffective during movement of the slide valve member by or against the other of said springs.

7. The valve of claim 6 wherein means are provided for adjusting the force exerted by each of said springs.

8. A valve for controlling a flow line comprising, a body, a flowway through the body, a valve seat across the flowway, a valve member cooperable with the seat and controlling flow through the flowway, a pressure responsive member connected to the valve member and when subjected to upstream pressure moving the valve member into engagement with the seat, a first conduit conducting upstream pressure fluid to the pressure responsive member, a slide valve including a slide valve body and slide valve member having two open positions and a closed position controlling said first conduit, a second conduit conducting downstream pressure to at least one endwise pressure responsive surface on the slide valve member, a first actuator connected to the slide valve member, first means resiliently loading the slide valve member in a direction opposing the force of downstream pressure on the slide valve member and moving it to first conduit-opening position upon the downstream pressure reducing to a predetermined value, a second actuator having a stop engaged by the first actuator and limiting relative movement of the first and second actuators in response to an increase in downstream pressure, second means resiliently loading the second actuator and resisting movement of the slide valve in response to an increase in downstream pressure, said slide valve member moving to first conduit-opening position against the force of said second resilient means upon the downstream pressure increasing to a predetermined value, and a stop on the slide valve body engaged by the second actuator and limiting movement of the second actuator by the second resilient means to a predetermined point.

9. A valve for controlling a flow line comprising, a body, a flowway through the body, a valve seat across the flowway, a valve member cooperable with the seat and controlling flow through the flowway, a pressure responsive member connected to the valve member and when subjected to upstream pressure moving the valve member into engagement with the seat, a first conduit conducting upstream pressure fluid to the pressure responsive member, a slide valve including a body and slide valve member having two open positions and a closed position controlling said first conduit, a second conduit conducting downstream pressure to one end of the slide valve member, a first actuator sleeve extending from the other end of the slide valve member, a second actuator sleeve telescoped over the first actuator sleeve and having a closed end overlying the end of the first actuator sleeve remote from the slide value member, a first spring within said first actuator sleeve and extending between the slide valve member and the closed end of the second actuator sleeve, said valve body having an endwise extending portion provided with first and second spaced abutments, said second abutment being more remote than said first abutment from the slide valve member, and a second spring compressed between the second actuator sleeve and said second abutment, said first abutment providing a stop limiting movement of the second actuator sleeve by said second spring.

10. A valve for controlling a flow line comprising, a body, a flowway through the body, a valve seat across the flowway, a valve member cooperable with the seat and controlling flow through the flowway, a pressure responsive member connected to the valve member and when subjected to upstream pressure moving the valve member into engagement with the seat, a first conduit conducting upsreamt pressure fluid to the pressure responsive member, a slide valve including a slide valve body and slide valve member having two open positions and a closed position controlling said first conduit, said slide valve provided by a telescoping pin and sleeve having spaced seals in line with the controlled conduit inlet when the slide valve is in closed position between the body and sleeve and the sleeve and pin, whereby axial movement of either of the pin or sleeve opens the conduit, a stop on the body limiting movement of the pin in one direction, a spring urging the pin against the stop, a pressure responsive surface on the pin, means exposing said pressure responsive surface to downstream pressure, said pressure responsive surface when pressurized urging the pin away from the stop whereby the pin remains against its stop when downstream pressure is less than a predetermined value and is moved away from its stop upon an increase in downstream pressure above a predetermined value, a stop on the slide valve body limiting movement of the sleeve in one direction, a spring urging the sleeve away from its stop, a pressure responsive surface on the sleeve, means exposing said last mentioned surface to downstream pressure, said pressure responsive surface on the sleeve when pressurized urging the sleeve toward its stop whereby the sleeve abuts its stop when the downstream pressure exceeds a predetermined value and is moved away from its stop when downstream pressure drops below a predetermined value, said valve being closed when said sleeve and pin are against their respective stops and open when either of the pin and sleeve moves away from its respective stop.

11. A valve for controlling a conduit comprising, a body having a bore therein providing a seat for a slide valve member, an inlet passageway in the body opening into the bore at at least one point, an outlet passageway in the body opening into the bore at at least one point spaced axially of the bore from said inlet opening, a valve member in said bore interrupting communication between the inlet and outlet pasageways when in a first position, a control conduit for conducting control fluid pressure to at least one endwise pressure responsive surface on the valve member, first resilient means urging the slide valve member in a direction opposed to the force exerted by control fluid pressure and moving the slide valve member to one open position when the control fluid pressure is less than a predetermined value, second resilient means urging the slide valve member in a direction opposed to the force exerted by control fluid pressure on the slide valve member, said slide valve member moving to a second open position against the force exerted by the second resilient means when the control fluid pressure is greater than a predetermined value, and stop means carried by the slide valve body limiting the distance through which the second resilient means is effective to urge said valve member against the force exerted by the control fluid pressure on the slide valve member.

12. The valve of claim 11 wherein second stop means is carried by the slide valve body limits contraction of the first resilient means.

13. A valve for controlling a conduit comprising, a body having a bore therein providing a seat for a slide valve member, an inlet passageway in the body terminating in the bore, an outlet passageway in the body terminating in the bore at a point spaced axially of the bore from said inlet terminus, one of said passageways having an additional terminus in the bore of the body at a point spaced axially of said previously mentioned termini, a valve member in said bore interrupting communication between the inlet and outlet passageways when in an intermediate position and establishing communication between said passageways when shifted axially in either direction, a control conduit for conducting control fluid pressure to an endwise pressure responsive surface on the valve member, first resilient means urging the slide valve member in a direction opposed to the force exerted by control fluid pressure on the slide valve member, second resilient means urging the slide valve member in a direction opposed to the force exerted by control fluid pressure on the slide valve member, and stop means carried by the slide valve body limiting the distance through which the second resilient means is effective to urge said valve member against the force exerted by control fluid pressure on the slide valve member.

14. The valve of claim 13 wherein second stop means is carried by the slide valve body and limits contraction of the first resilient means.

15. A three-position valve comprising, a body having a bore therein providing a seat for a slide valve member, an inlet passageway in the body terminating in the bore at at least one point in the bore, outlet passageways in the body terminating in the bore at three points spaced axially of the bore and spaced axially of the bore from the inlet opening, a valve member in said bore interrupting communication between the inlet and outlet passageways and establishing communication between the outlet passageway and a vent in the body when the valve member is in an intermediate position, said valve member interrupting communication between the outlet passageway and the vent passageway and establishing communication between the inlet and outlet passageways when shifted axially in either direction from said intermediate position, a control conduit for conducting control fluid pressure to an endwise pressure responsive surface on the valve member, first resilient means moving the slide valve member to one open position in response to a reduction in control fluid pressure, second resilient means resisting movement of the slide valve member to second open position in response to an increase in control fluid pressure, and stop means carried by the slide valve body and limiting expansion of the second resilient means to a predetermined point to maintain the second resilient means under a predetermined load and render the second resilient means ineffective until the control fluid pressure reaches a predetermined value.

16. A conduit control system comprising a main valve body, a flowway through the main valve body, a valve seat across the flowway, a main valve member cooperable with the seat and controlling flow through the flowway, a pressure responsive member connected to the main valve member, conduit means for venting and pressurizing with upstream pressure the pressure responsive member to open and close the valve, control valve means controlling the pressurizing conduit means responsive to downstream pressure and maintaining the conduit closed while downstream pressure remains within a predetermined range and opening the conduit to close the main valve when downstream pressure is above or below the range, and three-way manual selector valve means controlling the conduit means and in one position opening the conduit means between the pressure responsive member and control valve to permit automatic control of the main valve, and in the other two positions bypassing the control valve and in one of said other positions venting and in the other of said other positions pressurizing the pressure responsive member to close and open the main valve.

17. A conduit control system comprising a main valve body, a flowway through the main valve body, a valve seat across the flowway, a main valve member cooperable with the seat and controlling flow through the flowway, a pressure responsive member connected to the main valve member, conduit means for venting and pressurizing with upstream pressure the pressure responsive member to open and close the valve, control valve means controlling the conduit means in response to conditions in the line controlled by the main valve and closing the main valve when predetermined conditions exist in the line controlled, and selector valve means controlling the conduit means and in one position opening the conduit means between the pressure responsive member and control valve to permit automatic control of the main valve and in another position bypassing the control valve and venting the pressure responsive member to open the main valve.

18. A conduit control system comprising, a main valve body, a flowway through the main valve body, a valve seat across the flowway, a main valve member cooperable with the seat and controlling flow through the flowway, a pressure responsive member connected to the main valve member, conduit means for venting and pressurizing with upstream pressure the pressure responsive member to open and close the valve, control valve means controlling the conduit means in response to conditions in the line controlled by the main valve and closing the main valve when predetermined conditions exist in the line controlled, and three-way selector valve means controlling the conduit means and in one position opening the conduit between the pressure responsive member and control valve to permit automatic control of the main valve and in the other two positions bypassing the control valve, and in one bypass position venting and in the other bypass position pressurizing the pressure responsive member to close and open the main valve.

19. A conduit control system comprising a main valve body, a flowway through the main valve body, a valve seat across the flowway, a main valve member cooperable with the seat and controlling flow through the flowway, a pressure responsive member connected to the main valve member, conduit means for venting and pressurizing with upstream pressure the pressure responsive member to open and close the valve, control valve means controlling the conduit in response to downstream pressure and closing the main valve upon downstream pressure falling below or exceeding a predetermined pressure range, and selector valve means controlling the conduit means and in one position opening the conduit means to permit the control valve to control the conduit and in another position bypassing the control valve and venting the pressure responsive member to open the main valve.

20. A conduit control system comprising, a main valve body, a flowway through the main valve body, a valve seat across the flowway, a main valve member cooperable with the seat and controlling flow through the flowway, a pressure responsive member connected to the main valve member, conduit means for venting and pressurizing with upstream pressure the pressure responsive member to open and close the valve, control valve means controlling the conduit in response to downstream pressure and closing the main valve upon downstream pressure falling below or exceeding a predetermined pressure range, and selector valve means controlling the conduit means and in one position opening the conduit means to permit the control valve to control the conduit and in two other positions bypassing the control valve and in one of said other positions venting and in the other of said other positions pressurizing the pressure responsive member to close and open the main valve.

21. A valve for controlling a flow line comprising, a body, a flowway through the body, a valve seat across the flowway, a valve member cooperable with the seat and controlling flow through the flowway, a source of closing pressure, a pressure responsive member connected to the valve member and when subjected to said source of closing pressure moving the valve member into engagement with the seat, a first conduit conducting said source of closing pressure fluid to the pressure responsive member, a slide valve including a slide valve body and slide valve member having two open positions and a closed position controlling said first conduit, a second conduit conducting control fluid pressure to at least one endwise pressure responsive surface on the slide valve member, first resilient means urging the slide valve member in a direction opposed to the force exerted by the control fluid pressure on the slide valve member, second resilient means urging the slide valve member in a direction opposed to the force exerted by control fluid pressure on the slide valve member, and stop means carried by the slide valve body limiting the distance through which the first resilient means is effective to urge said valve member against the force exerted by control fluid pressure on the slide valve member.

22. A valve for controlling a flow line comprising, a body, a flowway through the body, a valve seat across the flowway, a valve member cooperable with the valve and controlling flow through the flowway, a source of closing fluid pressure, a pressure responsive member connected to the valve member and when subjected to said closing fluid pressure moving the valve member into engagement with the seat, a first conduit conducting said closing fluid pressure from said source to the pressure responsive member, a slide valve including a slide valve body and a slide valve member having two open positions and a closed position controlling said first conduit, a second conduit conducting control fluid pressure to at least one endwise pressure responsive surface on the slide valve member, said slide valve member when in closed position conducting fluid from the pressure responsive member to the second conduit whereby any pressure fluid previously effective against the pressure responsive member may be dumped into the second conduit when the slide valve member is returned to said closed position, first resilient means urging the slide valve member in a direction opposed to the force exerted by control fluid pressure on the slide valve member, second resilient means urging the slide valve member in a direction opposed to the force exerted by control fluid pressure on the slide valve member, and stop means carried by the slide valve body limiting the distance through which the first resilient means is effective to urge said valve member against the force exerted by control fluid pressure on the slide valve member.

23. A valve for controlling a flow line comprising, a body, a flowway through the body, a valve seat across the flowway and providing a pressure drop between pressure fluid upstream and downstream of the valve seat, a valve member cooperable with the seat and controlling flow through the flowway, a source of closing fluid pressure, a pressure responsive member connected to the valve member and when subjected to said source of closing fluid pressure moving the valve member into engagement with the seat, a first conduit conducting said closing fluid pressure to the pressure responsive member, a slide valve including a slide valve body and slide valve member having two open positions and a closed position controlling said first conduit, a second conduit conducting downstream fluid pressure to at least one endwise pressure responsive surface on the slide valve member, said slide valve member when in closed position conducting fluid from the pressure responsive member to the second conduit, whereby any pressure fluid previously effective against the pressure responsive member may be dumped into the second conduit when the slide valve is returned to closed position, first resilient means urging the slide valve member in a direction opposed to the force exerted by control fluid pressure on the slide valve member, second resilient means urging the slide valve member in a direction opposed to the force exerted by control fluid pressure on the slide valve member, and stop means carried by the slide valve body limiting the distance through which the first resilient means is effective to urge said valve member against the force exerted by control fluid pressure on the slide valve member.

24. A valve for controlling a flow line comprising, a body, a flowway through the body, a valve seat across the flowway, a valve member cooperable with the seat and controlling flow through the flowway, a pressure responsive member mounted in a chamber and connected to the valve member, means including conduit means for conducting fluid to and from the pressure responsive member for moving the valve member into and out of engagement with the seat, a control valve body having a bore therein, a member slidably mounted in said bore, means exposing an endwise pressure responsive surface on said member to a control fluid pressure, first resilient means urging said member in a direction opposed to the force exerted by control fluid pressure and moving the member to one position when the control fluid pressure is less than a predetermined value, second resilient means urging the slide valve member in a direction opposed to the force exerted by control fluid pressure on the member, said member moving to a second open position against the force exerted by the second resilient means when the control fluid pressure is greater than a predetermined value, stop means carried by the control valve body limiting the distance through which the second resilient means is effective to urge said member against the force exerted by the control fluid pressure on the member, and valve means associated with said slide member and controlling a portion of said conduit means, said valve means closed when the control pressure is between said predetermined values and open when the control pressure is outside of the range defined by said predetermined values in response to movement of said member to either of said positions.

25. A three-position valve comprising, a slide valve body having a first conduit therethrough and a slide valve member having two open positions and a closed position controlling said first conduit, a control conduit for conducting control fluid pressure to one end of the slide valve member, a first actuator sleeve extending from the other end of the slide valve member, a second actuator sleeve telescoped over the first actuator sleeve and having a closed end overlying the free end of the first actuator sleeve, a first spring within said first actuator sleeve and extending between the sleeve valve member and the closed end of the second actuator sleeve, said valve body having an endwise extending portion provided with first and second spaced abutments, said second abutment being more remote than said first abutment from the slide valve member and a second spring compressed between the second actuator sleeve and said second abutment, said first abutment providing a stop limiting movement of the second actuator sleeve by said second spring.

References Cited in the file of this patent
UNITED STATES PATENTS
2,902,046  Dollison _____ Sept. 1, 1959

OTHER REFERENCES

Univolt Pressurematic Balanced Piston Valve, article by Thornhill Craver Co., May 1959, pages 1 to 6.